US009229879B2

(12) United States Patent
Kumashikar et al.

(10) Patent No.: US 9,229,879 B2
(45) Date of Patent: Jan. 5, 2016

(54) POWER REDUCTION USING UNMODIFIED INFORMATION IN EVICTED CACHE LINES

(75) Inventors: Mahesh K. Kumashikar, Bangalore (IN); Ashok Jagannathan, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 961 days.

(21) Appl. No.: 13/180,481

(22) Filed: Jul. 11, 2011

(65) Prior Publication Data
US 2013/0019064 A1   Jan. 17, 2013

(51) Int. Cl.
*G06F 12/12* (2006.01)
*G06F 1/32* (2006.01)

(52) U.S. Cl.
CPC ............ *G06F 12/126* (2013.01); *G06F 1/3275* (2013.01); *Y02B 60/1225* (2013.01); *Y02B 60/1228* (2013.01)

(58) Field of Classification Search
CPC ............ G06F 12/0842; G06F 11/1405; G06F 12/0828; G06F 9/3851; G06F 9/3885; G06F 12/08; G06F 12/0811; G06F 12/0815; G06F 12/126; G06F 1/3275; G06F 2212/507
USPC ......... 711/118–119, 121–122, 128, 130, 133, 711/135–136, 141, 143–147, E12.001, 711/E12.023, E12.033; 710/3–4, 35, 305, 710/306, 307
See application file for complete search history.

(56) References Cited

U.S. PATENT DOCUMENTS

| 6,405,322 | B1* | 6/2002 | Gaither et al. ............... 714/5.11 |
| 6,643,741 | B1* | 11/2003 | Shuf et al. ...................... 711/135 |
| 8,074,026 | B2* | 12/2011 | Kim et al. ...................... 711/118 |
| 8,799,578 | B2* | 8/2014 | Ash et al. ....................... 711/119 |
| 2007/0028021 | A1* | 2/2007 | Gaskins ......................... 710/107 |
| 2008/0104332 | A1* | 5/2008 | Gaither et al. ................ 711/141 |
| 2010/0235320 | A1* | 9/2010 | Farrell et al. .................. 707/610 |
| 2011/0153944 | A1* | 6/2011 | Kursawe ....................... 711/122 |

* cited by examiner

*Primary Examiner* — Zhuo Li
(74) *Attorney, Agent, or Firm* — Schwabe, Williamson & Wyatt, P.C.

(57) ABSTRACT

Embodiments of the present disclosure describe techniques and configurations to reduce power consumption using unmodified information in evicted cache lines. A method includes identifying unmodified information of a cache line stored in a cache of a processor, tracking the unmodified information using a bit vector comprising one or more bits to indicate the unmodified information of the cache line, and selectively suppressing a write operation or send operation for the unmodified information of the cache line that is evicted from the cache to an input/output (I/O) component coupled to the cache, the selective suppressing being based on the one or more bits, and the I/O component being an outer component external to the cache. Other embodiments may be described and/or claimed.

21 Claims, 3 Drawing Sheets

POWER REDUCTION USING UNMODIFIED INFORMATION IN EVICTED CACHE LINES

FIELD

Embodiments of the present disclosure generally relate to the field of integrated circuits, and more particularly, to power reduction techniques and configurations using unmodified information in evicted cache lines.

BACKGROUND

Power consumption currently limits a number of cores/processors that can be used in multi-core/processor devices. For example, the transfer of information between cache(s) and/or input/output (I/O) components of a processor may include operations such as write operations or send operations that consume considerable power.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure provide techniques and configurations to reduce power consumption using unmodified information in evicted cache lines. In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. The term "coupled" may refer to a direct connection, an indirect connection, or an indirect communication.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
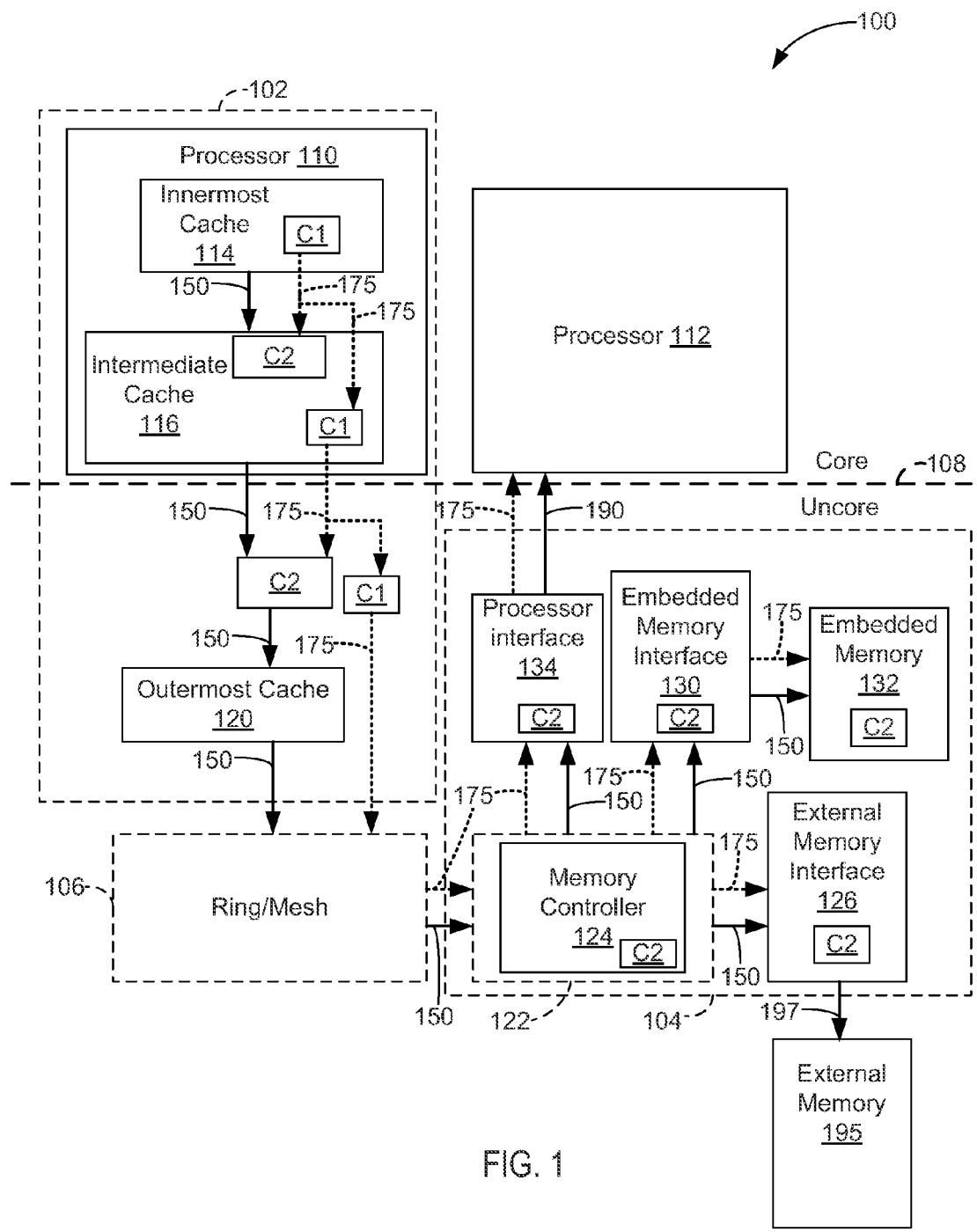
FIG. 1 schematically illustrates techniques and configurations for reducing power consumption in a processor-based system.

FIG. 1 schematically illustrates techniques and configurations for reducing power consumption in a processor-based system 100. The processor-based system 100 may generally include a digital block 102 coupled to an input/output (I/O) block 104 using a Ring/Mesh 106 or analogous feature to route information between the digital block 102 and the I/O block 104. The digital block 102 may include a processor 110 and associated cache (e.g., innermost cache 114, intermediate cache 116, and outermost cache 120) to store information for use by the processor 110. The I/O block 104 may include I/O components that interface with memory or other components that are external to the outermost cache 120 to store information for use by the processor 110. The I/O block 104 may include, for example, a memory controller 124, external memory interface 126, embedded memory interface 130, and embedded memory 132. The I/O block 104 may further include a processor interface 134 that couples the processor 110 to another processor (e.g., the processor 112). According to various embodiments, the processor-based system 100, except the external memory 195, may be formed on a single semiconductor substrate.

Information stored in a cache (e.g., any of innermost cache 114, intermediate cache 116, and outermost cache 120) of the processor 110 may be evicted from the cache to make room for a new cache entry. In FIG. 1, the evicted information from the cache is indicated by arrows 150. The evicted information may include information that has not been modified ("unmodified information"). In some embodiments, the term "unmodified" may refer to an untouched status of the information in the cache in some embodiments or may indicate that a value of the information in the cache has not changed. By identifying and/or tracking the unmodified information, a write operation (e.g., write-back operation) can be suppressed for the unmodified information and, thus, reduce power consumption in the processor-based system 100 by suppressing the writing of unmodified information.

The digital block 102 may include one or more tracking modules, C1, configured to identify and/or track unmodified information stored in the cache (e.g., any of the innermost cache 114, the intermediate cache 116, and/or the outermost cache 120) of the processor 110. In an embodiment, the one or more tracking modules C1 may maintain a bit vector that indicates the unmodified information of an entry (e.g., cache line) in the cache.

The digital block 102 may further include one or more suppression modules, C2, configured to selectively disable a write operation for the unmodified information that is evicted from the cache. That is, when an entry such as a cache line is evicted from the innermost cache 114 or the intermediate cache 116 along arrows 150, the bit vector maintained by the one or more tracking modules C1 may be sent to the suppression module C2 along arrows 175 so that the suppression module C2 can selectively disable a write operation for the unmodified information indicated by the bit vector. To be clear, the write operation may still be performed for modified information of the cache line.

The one or more tracking modules C1 and the one or more suppression modules C2 can be configured in a variety of ways in the processor-based system 100. In the depicted embodiment of FIG. 1, a tracking module C1 is provided for each of the innermost cache 114, the intermediate cache 116, and the outermost cache 120. The embodiment where a tracking module C1 is provided for each of the innermost cache 114, the intermediate cache 116, and the outermost cache 120, as depicted in the digital block 102 of FIG. 1, may provide greater power savings in the processor-based system 100 than other embodiments where fewer tracking modules C1 than depicted are used. A suppression module C2 may be provided for each of the intermediate cache 116, the outermost cache 120, and multiple components within the I/O block 104, as can be seen.

The tracking module C1 for the innermost cache 114 may be disposed in the innermost cache 114. According to various embodiments, the innermost cache 114 may be a level 1 (L1) or first-level cache (FLC) that is innermost to the processor 110. The terms "inner" or "outer" are generally used herein to describe a relative proximity of a cache or other component to a processor (e.g., processor 110). The proximity may generally refer to access proximity of information stored in the cache/component to the processor where, e.g., L1 cache is inner to L2 cache, L2 cache is inner to an I/O component of the I/O block 104, and so forth.

The tracking module C1 for the innermost cache 114 may identify the unmodified information by tracking a touched (e.g., written) or untouched (e.g., unwritten) status for information (e.g., quadword) stored in the innermost cache 114. The information that is untouched may be identified as being unmodified information. Such identification/tracking by the tracking module C1 for the innermost cache 114 can be triggered by each store operation of the innermost cache 114. The tracking information may be stored as a bit vector in table form in the innermost cache 114.

The bit vector may be used to identify the unmodified information at any desired level of granularity. For example, the bit vector may include a bit with a value (e.g., 1 or 0) that corresponds with and indicates that any of a bit, nibble, byte, octet, word, halfword, doubleword, quadword, octaword, doublet, or any other form of memory granule, is unmodified. The one or more tracking modules C1 may maintain a bit vector for each cache line entry. In one embodiment, the one or more tracking modules C1 may maintain an 8-bit vector per tag entry where each bit corresponds to a modified/unmodified status of a quadword in the tag entry.

When information is evicted (e.g., arrow 150) from the innermost cache 114, the tracking module C1 for the innermost cache 114 may send (e.g., arrow 175) the bit vector indicating the unmodified information of the evicted cache line to the suppression module C2 for the intermediate cache 116. The bit vector may generally be routed differently (e.g., arrow 175) than the evicted information (e.g., arrow 150). In an embodiment, the bit vector may be routed through the processor-based system 100 using a byte enable route (e.g., existing wiring/signals of the Ring/Mesh 106) and the evicted information may be routed using a cache pipeline, which may include routing features other than the byte enable route. In an embodiment, the byte enable route is 64-bits wide. Other bit sizes for the byte enable route can be used in other embodiments.

The suppression module C2 for the intermediate cache 116 may use the bit vector to disable a write operation for the unmodified information indicated by the bit vector. Unmodified information of the evicted cache line may be stored at the intermediate cache 116 and modified information of the same evicted cache line may undergo a write operation such as write-back to the intermediate cache 116. In an embodiment, the suppression module C2 may perform a write mask operation that selectively masks the unmodified information to suppress writing of the unmodified information at the intermediate cache 116. The suppression module C2 may use the bit vector to generate a mask vector, which may have bit-level granularity, to indicate which bits of the evicted cache line are to be masked/suppressed in writing. In an embodiment, the bit vector may comprise 8 bits to indicate unmodified information of a 64-byte cache line and the mask vector may comprise 512 bits, where each bit of the 8-bit vector expands 64 bits of the mask vector. Other bit sizes and/or granularity can be used in other embodiments.

The bit vector sent by the tracking module C1 for the innermost cache 114 may be further routed (e.g., arrows 175) to a tracking module C1 for the intermediate cache 116. According to various embodiments, the intermediate cache 116 may be a level 2 (L2) or mid-level cache (MLC) that is an outer cache to the processor 110 relative to the innermost cache 114. In embodiments where the tracking module C1 for the intermediate cache 116 receives the bit vector from the tracking module C1 for the innermost cache 114, the tracking module C1 for the intermediate cache 116 may not be configured to identify the unmodified information of the evicted cache line from the innermost cache 114 because the unmodified information may already be provided in the bit vector sent from the tracking module C1 for the innermost cache 114.

In other embodiments where a tracking module C1 is not provided for the innermost cache 114 at all, the tracking module C1 for the intermediate cache 116 may identify the unmodified information of the evicted cache line from the innermost cache 114 by performing a read operation of an existing cache line in the intermediate cache 116 and comparing the read cache line to the evicted cache line (e.g., an incoming cache line) for every write-back operation to the intermediate cache 116. The read/compare operations can determine whether the information of the incoming cache line is the same or different than an existing cache line in the intermediate cache 116. If the information is the same, then the information is determined to be unmodified information.

The tracking module C1 for the intermediate cache 116 may track the unmodified information by creating/storing a bit vector that indicates the unmodified information for each cache line evicted from the innermost cache 114 to the intermediate cache 116. The identification/tracking by the tracking module C1 for the intermediate cache 116 can be triggered by each write-back operation to the intermediate cache 116. The tracking information may be stored as a bit vector in table form in the intermediate cache 116. The suppression module C2 for the intermediate cache 116 may use the bit vector to selectively disable a write operation for the unmodified information to the intermediate cache 116.

When information is evicted (e.g., arrow 150) from the intermediate cache 116, the tracking module C1 for the intermediate cache 116 may send (e.g., arrow 175) the bit vector indicating the unmodified information of the evicted cache line to the suppression module C2 for the outermost cache 120. According to various embodiments, the outermost cache 120 may be a level 3 (L3) or last-level cache (LLC) that is an outer cache to the processor 110 relative to the intermediate cache 116. In the depicted embodiment, the suppression module C2 for the outermost cache 120 may be a part of control circuitry external to the outermost cache 120 that stages write-back of information to the outermost cache 120 from the intermediate cache 116. In other embodiments, the suppression module C2 for the outermost cache 120 can be disposed in the outermost cache 120.

The suppression module C2 for the outermost cache 120 may use the bit vector sent by the tracking module C1 for the intermediate cache 116 to disable a write operation for the unmodified information indicated by the bit vector. Unmodified information of the evicted cache line may be stored at the outermost cache 120 and modified information of the same evicted cache line may undergo a write operation such as write-back to the outermost cache 120. The suppression module C2 for the outermost cache 120 can selectively disable a write operation for the unmodified information using similar techniques as described for the suppression module C2 for the intermediate cache 116.

The bit vector sent by the tracking module C1 for the intermediate cache 116 may be further routed (e.g., arrows 175) to a tracking module C1 for the outermost cache 120, as can be seen in FIG. 1. In the depicted embodiment, the tracking module C1 for the outermost cache 120 is a part of control circuitry external to the outermost cache 120 that stages write-back of information to the outermost cache 120 from the intermediate cache 116. In other embodiments, the tracking module C1 for the outermost cache 120 can be disposed in the outermost cache 120. The tracking module C1 for the outermost cache 120 identifies/tracks the unmodified information using similar techniques as described for the tracking module C1 for the intermediate cache 116.

In embodiments where the tracking module C1 for the outermost cache 120 receives the bit vector from the tracking module C1 for the intermediate cache 116, the tracking module C1 for the outermost cache 120 may not be configured to identify the unmodified information of the evicted cache line from the intermediate cache 116 because the unmodified information is already provided in the bit vector sent from the tracking module C1 for the intermediate cache 116. In other embodiments where a tracking module C1 is not provided for the innermost cache 114 and/or the intermediate cache 116 at all, the tracking module C1 for the outermost cache 120 may identify the unmodified information of the evicted cache line from the intermediate cache 116 by performing a read operation of an existing cache line in the outermost cache 120 and comparing the read cache line to the evicted cache line from the intermediate cache 116 for every write-back operation to the outermost cache 120. The read/compare operations can determine whether the information of the incoming evicted cache line is the same or different than an existing cache line in the outermost cache 120. If the information is the same, then the information may be determined to be unmodified information.

In an embodiment, the innermost cache 114 and the intermediate cache 116 are dedicated cache for the processor 110 and the outermost cache 120 is shared cache for the processor 110 and another processor (e.g., processor 112). The processor 110, innermost cache 114, intermediate cache 116, and processor 112 may be part of a core region of the processor-based system 100, which is demarcated from an uncore region of the processor-based system 100 by dashed line 108. The outermost cache 120, ring/mesh 106, and components of the I/O block 104 are part of the uncore region. Other configurations for a processor-based system can be used in other embodiments.

One or more suppression modules C2 can be provided for various components of the I/O block 104 to selectively disable writing and/or further sending of unmodified information that is evicted from the digital block 102. When a cache line is evicted (e.g., arrow 150) from the outermost cache 120, the tracking module C1 of the outermost cache 120 may send (e.g., arrow 175) a bit vector that indicates unmodified information of the evicted cache line to the I/O block 104 through routing/bus such as ring/mesh 106. In an embodiment, the arrows 175 may indicate a byte enable route over which the bit vector is sent. The one or more suppression modules C2 of the I/O block 104 may use the bit vector (e.g., routed over arrows 175) to suppress writing or sending of the unmodified information in the evicted cache line.

The information of the evicted cache line (e.g., arrow 150) and the bit vector indicating the unmodified information of the evicted cache line (e.g., arrow 175) may be sent to a control block 122 of the I/O block 104. The control block 122 may include a memory controller 124 such as an external memory controller or embedded memory controller. The control block 122 may include other features such as, for example, a ring stop (not shown).

In an embodiment, the memory controller 124 may include a suppression module C2 that selectively disables a write operation at a memory interface such as, for example, embedded memory interface 130. The suppression module C2 may selectively suppress the write operation by generating a mask vector and/or using a write mask operation to mask writing of the unmodified information in the evicted cache line as described herein. Alternatively, the embedded memory interface 130 may include the suppression module C2 to write mask the unmodified information at the embedded memory interface 130. A write suppression module C2 can be provided for embedded memory 132, which may include for example, embedded dynamic random access memory (DRAM), to write mask the unmodified information at the embedded memory.

The I/O block 104 may include an external memory interface 126 such as, for example, a double data rate interface (e.g., DDR 2, DDR 3, DDR 4, etc.). In an embodiment, the external memory interface 126 includes a suppression module C2 to write mask unmodified information at the external memory interface 126. For example, in DDR2 and/or DDR3, write mask information (e.g., mask vector) can be sent on data mask (DM) pins (e.g., one DM pin per byte). Power consumption can be reduced at the external memory interface 126 by suppressing toggling of data wires (e.g., DQ) of the external memory interface 126 that correspond with the unmodified information. In DDR4, burst length changes can be used to suppress writes. The external memory interface 126 may output (e.g., arrow 197) the evicted information processed by the suppression module C2 of the external memory interface 126 to external memory 195, which can include any suitable form of memory including, for example, DRAM.

The I/O block 104 may include a processor interface 134 that couples the processor 110 to another processor (e.g., the processor 112). The processor interface 134 may include, for example a point-to-point processor interconnect. In an embodiment, the processor interface 134 includes a suppression module C2 that disables sending of the unmodified information at the processor interface 134. The suppression module C2 may include protocol support that disallows sending of the unmodified information at the processor interface 134 for evicted cache lines, but allows sending of modified information (e.g., arrows 190) and sending of the bit vector indicating the unmodified information of the evicted cache line (e.g., arrows 175).

Other processor-based systems that benefit from the principles described herein can be used in other embodiments. For example, more or fewer levels of cache than depicted in the processor-based system 100 of FIG. 1 may be used in other embodiments. In some embodiments, one or all of the suppression module(s) C2 may not be implemented in the digital block 102 at all and more or fewer suppression module(s) C2 may be implemented in the I/O block 104.

Figure 2:
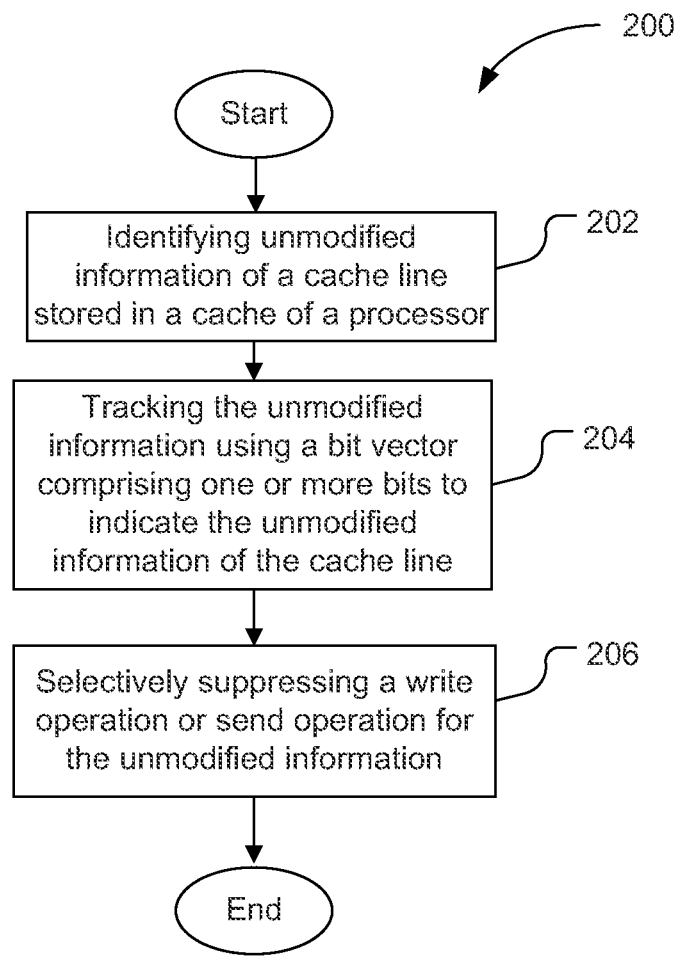
FIG. 2 is a flow diagram of a method for reducing power consumption in a processor-based system.

FIG. 2 is a flow diagram of a method 200 for reducing power consumption in a processor-based system (e.g., the processor-based system 100 of FIG. 1). At 202, the method 200 may include identifying unmodified information of a cache line stored in a cache (e.g., any of innermost cache 114, intermediate cache 116, and outermost cache 120 of FIG. 1) of a processor (e.g., processor 110 of FIG. 1).

In one embodiment, the unmodified information of a cache line stored in an innermost cache may be identified by a tracking module (e.g., tracking module C1 of FIG. 1) in an innermost cache. The unmodified information can be identified in the innermost cache by tracking a touched/untouched status of information (e.g., quadword or any other granularity) of a cache line stored in the innermost cache. Untouched information may be identified as unmodified information. Such identification by the tracking module for the innermost cache can be triggered by each store operation of the innermost cache. Identification of the unmodified information in the innermost cache may allow tracking modules in an intermediate cache and/or outermost cache of the processor to simply track the unmodified information without identifying the unmodified information that is evicted from the innermost cache.

In another embodiment, the unmodified information of a cache line evicted from an innermost cache may be identified by a tracking module in an intermediate cache. The tracking module for the intermediate cache may identify the unmodified information of the evicted cache line from the innermost cache by performing a read operation of an existing cache line in the intermediate cache and comparing the read cache line to the evicted cache line (e.g., an incoming cache line) for every write-back operation to the intermediate cache. The read/compare operations can determine whether the information of the incoming cache line is the same or different than an existing cache line in the intermediate cache. If the information is the same, then the information may be determined to be unmodified information. The identification of the unmodified information may be performed by the tracking module in the intermediate cache in a case where the unmodified information is not identified/sent by the tracking module in the innermost cache.

In yet another embodiment, the unmodified information of a cache line evicted from an intermediate cache may be identified by a tracking module in an outermost cache. The tracking module for the outermost cache may identify the unmodified information using a similar technique as described for the intermediate cache (e.g., read/compare operation of existing/incoming cache line). The identification of the unmodified information may be performed by the tracking module in the outermost cache in a case where the unmodified information is not identified/sent by the tracking module in the intermediate cache or the innermost cache.

At 204, the method 200 may further include tracking the unmodified information using a bit vector comprising one or more bits to indicate the unmodified information of the cache line. In an embodiment, the tracking of unmodified information stored in an innermost cache can be performed by a tracking module for the innermost cache. The tracking module for the innermost cache may generate, store, and/or maintain a bit vector to indicate the unmodified information identified at 202. The bit vector can be updated at each store operation of the innermost cache to reflect the identified unmodified information. Upon eviction of the cache line from the innermost cache, the tracking module for the innermost cache may send the bit vector that indicates the unmodified information of the cache line to a suppression module (e.g., suppression module C2 of FIG. 1) to selectively disable a write operation for the unmodified information at an outer cache to the innermost cache.

In another embodiment, the tracking of unmodified information stored in an intermediate cache or outermost cache may be performed by a tracking module for the respective intermediate cache or outermost cache. The tracking module for the intermediate cache or outermost cache may generate, store, and/or maintain a bit vector to indicate the unmodified information identified at 202. The bit vector can be updated at each write-back operation to the intermediate cache or outermost cache. Upon eviction of the cache line from the intermediate cache or the outermost cache, the tracking module can send the bit vector that indicates the unmodified information of the cache line to a suppression module to selectively disable a write operation for the unmodified information at an outer cache or other outer component to the intermediate cache or the outermost cache.

The bit vector for tracking the unmodified information may be in table form. According to various embodiments, the bit vector may be sent over a byte enable route and the evicted cache line may be sent over a cache pipeline.

At 206, the method 200 may further include selectively suppressing a write operation or send operation for the unmodified information. In an embodiment, a suppression module for the intermediate cache may selectively suppress a write operation of unmodified information evicted from the innermost cache based on the one or more bits of the bit vector sent by the tracking module for the innermost cache. In another embodiment, the suppression module for the intermediate cache may selectively suppress a write operation of unmodified information evicted from the innermost cache based on the one or more bits of the bit vector identified/maintained by the tracking module for the intermediate cache. A suppression module for the outermost cache may selectively suppress a write operation of unmodified information evicted from the intermediate cache (or innermost cache if an intermediate cache is not present) based on either the one or more bits of the bit vector sent by the tracking module of the intermediate cache (or innermost cache) or the one or more bits of the bit vector identified/maintained by the tracking module of the outermost cache.

The write operation can be selectively suppressed by performing a write mask operation that selectively masks the unmodified information based on the one or more bits of the bit vector to prevent writing of the unmodified information. A mask vector may be generated by the suppression module, at bit-level granularity or greater, based on the one or more bits of the bit vector sent/maintained by the tracking module. The mask vector can be used to write-mask the unmodified information.

In some embodiments, the selective suppressing may include selectively suppressing a write operation or send operation for the unmodified information of a cache line that is evicted from the cache to an input/output (I/O) component (e.g., components of I/O block 104 of FIG. 1) coupled to the cache, where the I/O component is an outer component to the processor relative to the cache. The I/O component can include any of a memory controller (e.g., memory controller 124 of FIG. 1), external memory interface (e.g., external memory interface 126 of FIG. 1), embedded memory interface (e.g., embedded memory interface 130 of FIG. 1), embedded memory (e.g., embedded memory 132 of FIG. 1), or a processor interface (e.g., processor interface 134 of FIG. 1), or combinations thereof. The suppression module may be disposed in any, multiple, or each of the I/O components.

The suppression module may suppress a write/send operation based on the bit vector sent by the tracking module for the outermost cache of the processor. For example, the suppression module may suppress a write operation by generating a mask vector for write-masking based on the bit vector at any of the memory controller, external memory interface, embedded memory interface, or embedded memory. In another example, the suppression module may suppress a send operation at the processor interface by I/O component by providing protocol support that disallows sending of the unmodified information at the processor interface for evicted cache lines based on the bit vector.

Figure 3:
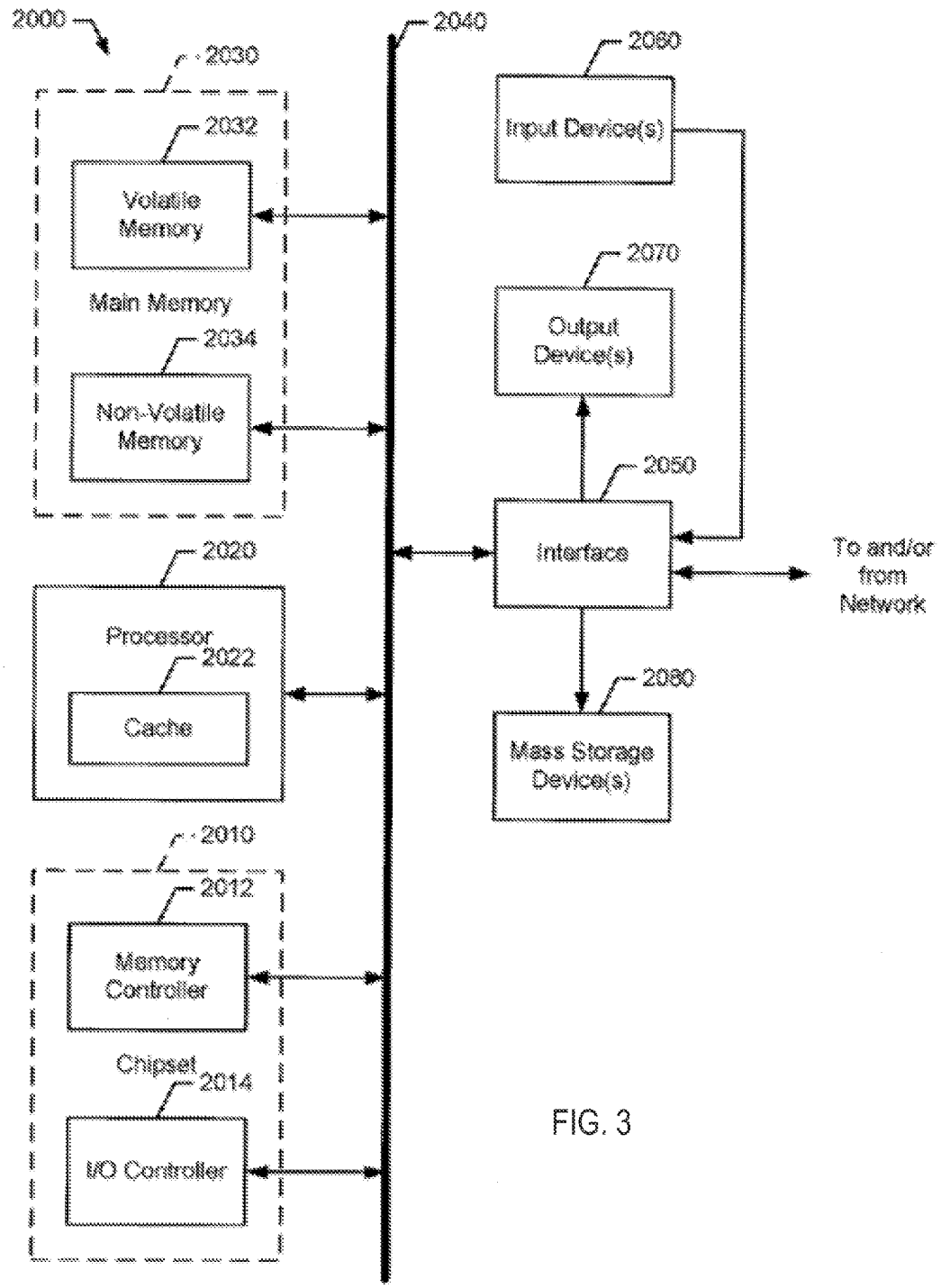
FIG. 3 schematically illustrates another example processor-based system that may be used to practice various embodiments described herein.

FIG. 3 schematically illustrates another example processor-based system 2000 that may be used to practice various embodiments described herein. The processor-based system 2000 may be a desktop computer, a laptop computer, a handheld computer, a tablet computer, a PDA, a server, an Internet appliance, a mobile handset and/or any other type of computing device.

The processor-based system 2000 may include a chipset 2010, which includes a memory controller 2012 and an input/output (I/O) controller 2014. The chipset 2010 may correspond with control block 122 of FIG. 1. That is, the memory controller 2012 may, for example, comport with embodiments described in connection with the memory controller 124 of FIG. 1. The chipset 2010 may provide memory and I/O management functions as well as a plurality of general purpose and/or special purpose registers, timers, etc. that are accessible or used by a processor 2020. The processor 2020, which may comport with embodiments described in connection with processor 110 of FIG. 1, may be implemented using one or more processors and/or other suitable processing components. The processor 2020 may include a cache 2022, which may be implemented using a first-level unified cache (L1), a second-level unified cache (L2), a third-level unified cache (L3), and/or any other suitable structures to store data. The cache 2022 may comport with embodiments described in connection with innermost cache 114, intermediate cache 116, and/or outermost cache 120 of FIG. 1.

The memory controller 2012 may perform functions that enable the processor 2020 to access and communicate with a main memory 2030 including a volatile memory 2032 and a non-volatile memory 2034 via a bus 2040. While FIG. 3 shows a bus 2040 to communicatively couple various components to one another, other embodiments may include additional/alternative interfaces.

The volatile memory 2032 may be implemented by synchronous dynamic random access memory (SDRAM), dynamic random access memory (DRAM), RAMBUS dynamic random access memory (RDRAM), and/or any other type of random access memory device. The volatile memory 2032 may comport with embodiments described in connection with embedded memory 132 and/or external memory 195 of FIG. 1. The non-volatile memory 2034 may be implemented using flash memory, read only memory (ROM), electrically erasable programmable read only memory (EEPROM), and/or any other desired type of memory device.

An article of manufacture is disclosed herein. The article of manufacture may include a computer-readable medium having instructions stored thereon, that if executed, result in the actions described herein such as the actions of method 200 of FIG. 2. The computer-readable medium may include, for example, components of main memory 2030 and/or the mass storage device(s) 2080 or any other suitable storage medium.

The processor-based system 2000 may also include an interface circuit 2050 that is coupled to the bus 2040. The interface circuit 2050 may be implemented using any type of interface standard such as an Ethernet interface, a universal serial bus (USB), a third generation input/output interface (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor-based system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor-based system 2000 and the network may be any type of network connection such as an Ethernet connection, a digital subscriber line (DSL), a telephone line, a cellular telephone system, a coaxial cable, etc.

In some embodiments, the interface circuit 2050 may include a wireless network interface controller having one or more antennae (not shown in the figure) to establish and maintain a wireless communication link with one or more components of a wireless network. The system host system 2000 may wirelessly communicate with the one or more components of the wireless network in accordance with any of one or more wireless network standards and/or protocols.

In some embodiments, the processor-based system 2000 may be coupled to an antenna structure (not shown in the figure) to provide access to other devices of a network. In some embodiments, the antenna structure may include one or more directional antennas, which radiate or receive primarily in one direction (e.g., for 120 degrees) and/or one or more omnidirectional antennas, which radiate or receive equally well in all directions.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 3 are depicted as separate blocks within the processor-based system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A method, comprising:
    identifying unmodified information of a cache line stored in a cache of a processor;
    tracking the unmodified information using a bit vector including one or more bits to indicate the unmodified information of the cache line;
    routing the bit vector from the cache to an outer cache of the processor;
    writing or sending the cache line that is evicted from the outer cache to an input/output (I/O) component coupled to the outer cache, the writing or sending being based at least in part on the bit vector to selectively suppress writing or sending of the unmodified information, and the I/O component being an outer component external to the outer cache;
    routing the bit vector to an external memory interface; and
    toggling of one or more data wires of the external memory interface that correspond with the unmodified information based at least in part on the bit vector.

2. The method of claim 1, wherein the unmodified information is identified based at least in part on a touched or untouched status of information of the cache line.

3. The method of claim 1, wherein:
    the cache is an inner cache to the outer cache of the processor; and the method further comprising:
        performing a read operation of another cache line in the outer cache of the processor; and
        identifying the unmodified information by comparing the another cache line to the cache line comprising the unmodified information that is evicted from the inner cache.

4. The method of claim 1, wherein:
    the unmodified information comprises a quadword; and
    the bit vector comprises one bit that corresponds to the quadword, the one bit having a value that indicates that the quadword is unmodified.

5. The method of claim 1, further comprising:
    sending the bit vector to the I/O component using a byte enable route.

6. The method of claim 1, wherein the outer cache is an outermost cache of the processor.

7. The method of claim 1, wherein:
    the I/O component comprises embedded memory.

8. The method of claim 1, wherein:
    the I/O component comprises at least one of a memory controller and a memory interface.

9. The method of claim 1, wherein:
    the I/O component comprises a processor interface that couples the processor to another processor, and the sending comprises selectively suppressing sending the unmodified information at the processor interface based on the one or more bits.

10. The method of claim 1, wherein the cache is an inner cache to an outermost cache of the processor, the method further comprising:
    selectively disabling a write operation for the unmodified information of the cache line to the outermost cache, said selective disabling being based on the one or more bits.

11. An apparatus comprising:
    a processor;
    a cache of the processor;
    an input/output (I/O) component coupled to the cache, the I/O component being an outer component to the processor relative to the cache;
    a tracking module to track unmodified information of a cache line stored in the cache using a bit vector comprising one or more bits to indicate the unmodified information of the cache line, the bit vector based at least in part on another bit vector routed from an inner cache of the processor;
    a suppression module to write or send the cache line evicted from the cache to the I/O component based on the one or more bits to selectively suppress writing or sending of the unmodified information; and
    an external memory interface, coupled with the cache of the processor, to toggle one or more data wires of the external memory interface corresponding with the unmodified information based at least in part on the bit vector.

12. The apparatus of claim 11, wherein the cache is an outermost cache of the processor, the apparatus further comprising:
    the inner cache of the processor.

13. The apparatus of claim 12, wherein:
    the tracking module comprises circuitry that is disposed within the inner cache; and
    the inner cache is dedicated cache of the processor and not shared cache of the processor.

14. The apparatus of claim 12, wherein:
    the tracking module comprises circuitry that is disposed within the outermost cache; and
    the outermost cache is shared cache of the processor.

15. The apparatus of claim 12, wherein:
    the suppression module comprises circuitry that is disposed within the I/O component; and
    the I/O component is (i) coupled to the outermost cache using a cache pipeline and (ii) coupled to the tracking module using a byte enable route.

16. The apparatus of claim 15, wherein the I/O component comprises at least one of a memory controller, embedded memory, and a memory interface.

17. The apparatus of claim 16, wherein the I/O component comprises a double data rate (DDR) memory interface.

18. The apparatus of claim 15, wherein the I/O component comprises a processor interface that couples the processor to another processor.

19. The apparatus of claim 11, wherein the cache is inner to an outermost cache of the processor.

20. The apparatus of claim 19, further comprising:
    another suppression module for the outermost cache to selectively disable a write operation for the unmodified information from the outermost cache, said selective disabling being based on the one or more bits, and the cache is to route the bit vector to the outermost cache.

21. The apparatus of claim 17, further comprising:
external memory coupled to the DDR memory interface, the external memory comprising a dynamic random access memory (DRAM) device.

\* \* \* \* \*